(12) United States Patent
Squires

(10) Patent No.: US 10,031,860 B2
(45) Date of Patent: Jul. 24, 2018

(54) MEMORY TRANSFER OF OBJECTS IN A DATA STORAGE DEVICE

(71) Applicant: HGST Netherlands B.V., Amsterdam (NL)

(72) Inventor: Christopher J. Squires, Boulder, CO (US)

(73) Assignee: Western Digital Technologies, Inc., San Jose, CA (US)

( * ) Notice: Subject to any disclaimer, the term of this patent is extended or adjusted under 35 U.S.C. 154(b) by 383 days.

(21) Appl. No.: 14/495,863

(22) Filed: Sep. 24, 2014

(65) Prior Publication Data

US 2016/0085689 A1    Mar. 24, 2016

(51) Int. Cl.
*G06F 12/1081*    (2016.01)
*G06F 12/02*    (2006.01)
*G06F 13/28*    (2006.01)

(52) U.S. Cl.
CPC ...... *G06F 12/1081* (2013.01); *G06F 12/0246* (2013.01); *G06F 13/28* (2013.01); *G06F 2212/2532* (2013.01); *G06F 2212/7202* (2013.01); *Y02D 10/14* (2018.01)

(58) Field of Classification Search
CPC ............. G06F 12/0835; G06F 12/1081; Y02B 60/1228
See application file for complete search history.

(56) References Cited

U.S. PATENT DOCUMENTS

| | | | |
|---|---|---|---|
| 5,504,926 A * | 4/1996 | Jackson | G06F 3/0601 700/2 |
| 5,854,638 A | 12/1998 | Tung | |
| 6,366,977 B1 * | 4/2002 | Mizoguchi | G06F 3/061 710/33 |
| 7,219,169 B2 | 5/2007 | Lee et al. | |
| 7,444,435 B2 | 10/2008 | King et al. | |
| 7,512,746 B2 | 3/2009 | Matsunami et al. | |
| 7,734,713 B2 * | 6/2010 | Gray | G06F 3/0607 709/213 |
| 8,032,670 B2 | 10/2011 | Go et al. | |
| 8,266,342 B1 * | 9/2012 | Takada | G06F 3/0613 345/537 |
| 8,386,887 B2 | 2/2013 | Frost et al. | |

(Continued)

OTHER PUBLICATIONS

IEEE Explore Digital Library, "Design of SSCMP with Arbiter and Shared Data Memory Interrupt", Retrieved at http://ieeexplore.ieee.org/xpl/articleDetails.jsp?reload=true&tp=&arnumber=4283635&queryText%3DSHARED+MEMORY+FOR+COUPLING+DATA+TRANSFERS+AND+SCSI+COMMANDS on Jan. 23, 2014, 2 pages.

IEEE Explore Digital Library, "Debugging Distributed-Shared-Memory Communication at Multiple Granularities in Networks on Chip", Retrieved at http://ieeexplore.ieee.org/xpl/articleDetails.jsp?tp=&arnumber=4492720&queryText%3DON+CHIP+SHARED+MEMORY+FOR+DATA+AND+STORAGE+COMMANDS on Jan. 23, 2014, 2 pages.

(Continued)

*Primary Examiner* — Farley Abad

(57) ABSTRACT

Herein are data storage devices to transfer a data object between memory regions during a storage operation. These data storage devices include a host controller configured to identify an object stored in a host region of a memory system for writing to a storage media controlled by a drive controller. The host controller initiates a memory transfer operation to transfer an object from the host region of the memory system to a drive region of the memory system. The host controller transfers a storage command to the drive controller to write the object to the storage media. The drive controller may be configured to transfer an object from the drive region to the host region when reading the object.

24 Claims, 12 Drawing Sheets

(56) References Cited

U.S. PATENT DOCUMENTS

| | | | | |
|---|---|---|---|---|
| 8,463,866 B2 | 6/2013 | Haviv | | |
| 8,588,228 B1* | 11/2013 | Onufryk | ................. | G06F 13/24 |
| | | | | 370/389 |
| 2009/0271584 A1* | 10/2009 | Toda | ....................... | G06F 21/31 |
| | | | | 711/163 |
| 2009/0323708 A1* | 12/2009 | Ihle | ........................ | G06F 13/28 |
| | | | | 370/402 |

OTHER PUBLICATIONS

IEEE Explore Digital Library, "Hardware and software architectures for the CELL processor", Retrieved at http://ieeexplore.ieee.org/xpl/articleDetails.jsp?tp=&arnumber=4076300&queryText%3DON+CHIP+SHARED+MEMORY+FOR+DATA+AND+COMMANDS on Jan. 27, 2014, 2 pages.

\* cited by examiner

MEMORY TRANSFER OF OBJECTS IN A DATA STORAGE DEVICE

TECHNICAL BACKGROUND

A storage drive includes a non-volatile physical storage media such as a magnetic or optical mechanical disk or a solid state drive. The storage media is operated by a drive controller to read and write data to the media and transfer data to and from drive controller memory. A drive controller may load from firmware and execute an instance of a real time operating system (RTOS).

A network connected drive is deployed on a network, as a blade or other rack card form factor. In addition to providing remote storage, a network connected drive may host a variety of platform services such as a network file system or a distributed data store. To provide these or other additional services, a network connected drive includes a host controller. The host controller and drive controller have separate processors and execute separate operating systems. Typically, the host controller and drive controller exist as isolated subsystems residing in separate packages placed on one or more printed circuit boards. Due to execution of separate operating systems that independently allocate memory, the host controller and drive controller generally do not share a memory address space or physical memory.

Between the host controller and drive controller is a bus, such as a Small Computer System Interface (SCSI) bus, a Serial Attached SCSI (SAS) bus, Serial ATA (SATA) bus, Fibre Channel, or any other protocol bus for transferring commands and exchanging data objects. Either the host controller or the drive controller may transfer data over the bus, depending on whether the data is read or written. Writing data onto the bus requires copying the data from memory. Reading data off of the bus requires copying the data into memory. For example when writing data, the host controller copies data from a host controller memory onto the bus, and then the drive controller copies the data from the bus into a drive controller memory. As such, dispatching either a write command or a read command requires a data object be copied at least twice, which can increase latency.

OVERVIEW

Examples disclosed herein provide data storage devices to transfer a data object between memory regions during storage operation for the object. In one example, a data storage device includes a host controller configured to identify an object stored in a host region of a memory system for writing to a storage media controlled by a drive controller. The host controller initiates a memory transfer operation to transfer at least a portion of the object from the host region of the memory system to a drive region of the memory system. The host controller transfers a storage command to the drive controller to write at least the portion of the object to the storage media. In one instance, the drive controller is configured to transfer an object from the drive region to the host region of the memory system in fulfillment of a storage command to read an object.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DETAILED DESCRIPTION

Examples herein are data storage devices having an optimized internal data pathway. Inside each of these data storage devices is a memory system and controllers. As in older data storage devices, memory isolation of controllers is maintained. Each controller manages its own region of the memory system. Because the controllers share the memory system, data may be transferred between two controller regions of memory. Data transfer between two controller regions occurs within the memory system. Each controller may initiate such a memory transfer.

Although management of data still passes between controllers during operation, this no longer requires transferring the data in and out of memory. Instead the passing of data management between controllers occurs by data transfer within the shared memory, between controller memory regions. The result is operational efficiency along the data pathway within a data storage device. This may achieve device acceleration, reduced power consumption, increased reliability, or other advantages.

An implementation may rely on industry-standard interfaces for internal operation, such as SATA, SCSI, SAS, or other similar types of busses for coordination between controllers. Herein is an example having a direct memory access (DMA) controller for transferring data between controller memory regions.

Responsibility for transfers between regions may be configured into a host controller, a drive controller, or both. Which controller is responsible may depend on whether data is being read or written. The controllers execute program instructions to initiate data transfers within shared memory and fulfill other responsibilities, such as running an operating system instance.

An implementation may rely on industry-standard interfaces for deployment integration. Deployment in a data center or a personal system is considered herein. Herein are examples having a network or other communication interface. Herein are examples that allow distributed operation, redundancy, and horizontal scalability. Virtualization of network or operating system is considered herein. Physical enclosure for aggregating these data storage devices is discussed.

Herein are examples of physical packaging of an individual data storage device. Implementations may have a degree of circuitry integration according to design tradeoffs such as initial cost, marginal cost, and time to market. System-on-chip, system-in-package, and discrete components are considered.

Figure 11:
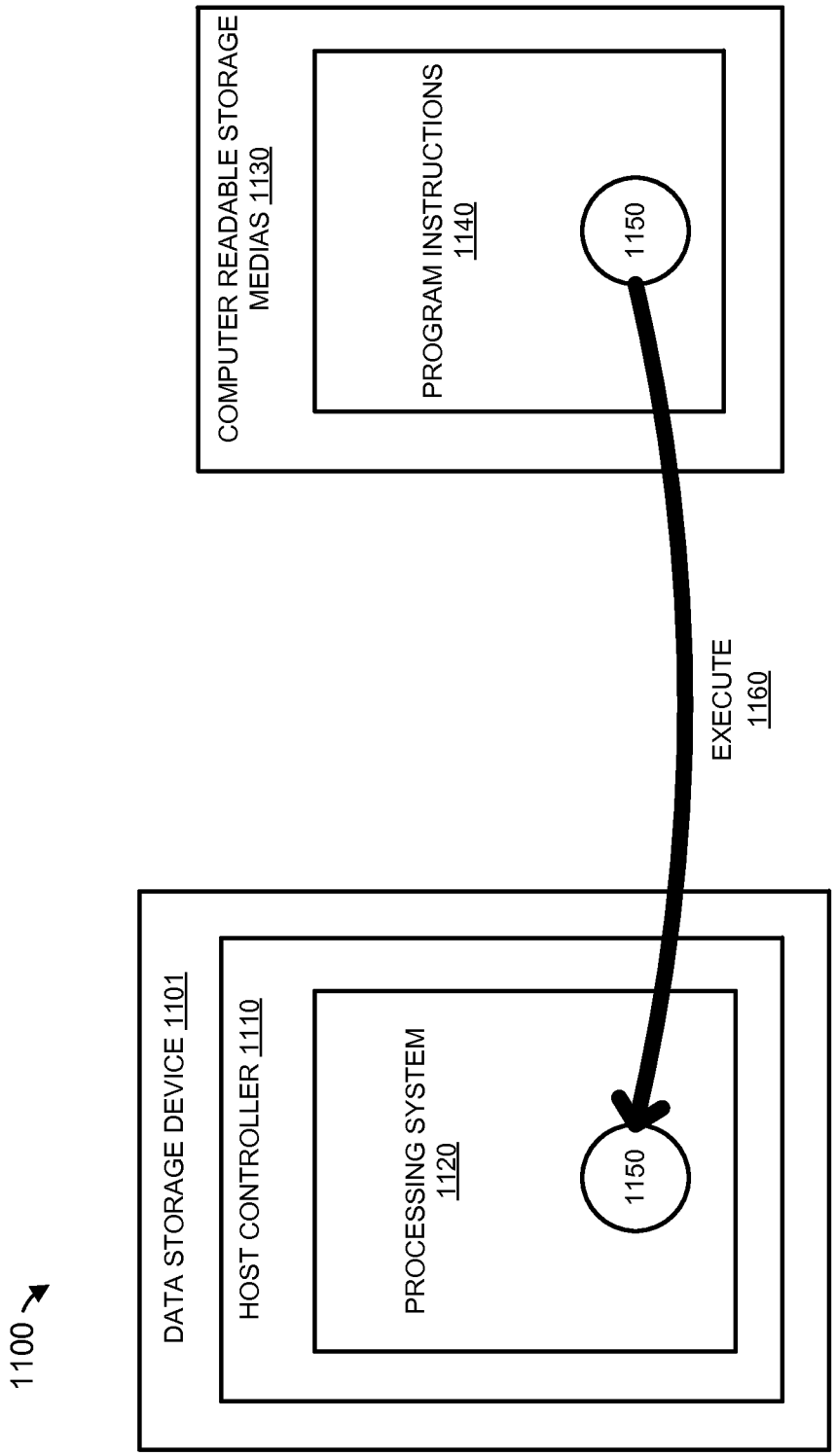
FIG. 11 illustrates a data storage system.
Figure 12:
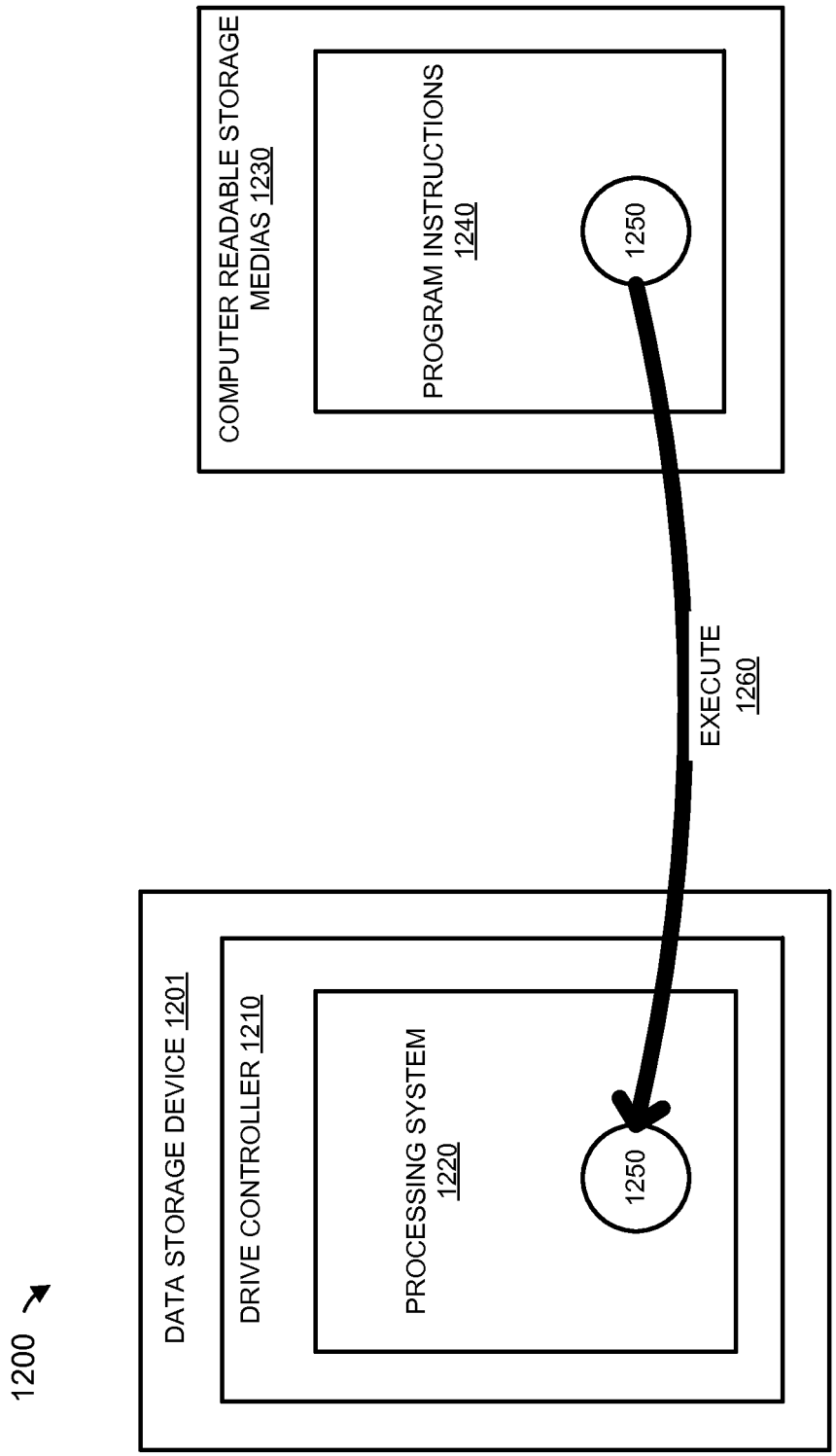
FIG. 12 illustrates a data storage system.

In FIGS. 1-4, some data storage devices and their operation are explained, including data transfer between controller regions of shared memory, interactions between controllers, and control of an underlying storage media. Physical aggregation of individual data storage devices and physical aggregation of collections of data storage devices are presented in FIG. 5. FIGS. 6-10 present a network connected drive that combines a data storage device and a network interface. Internally, this network connected drive uses SCSI or other data buses, DMA, operating systems, and application process execution. FIGS. 11-12 present architectures for executing program instructions that configure the operation of internal controllers in any implementation herein.

Figure 1:
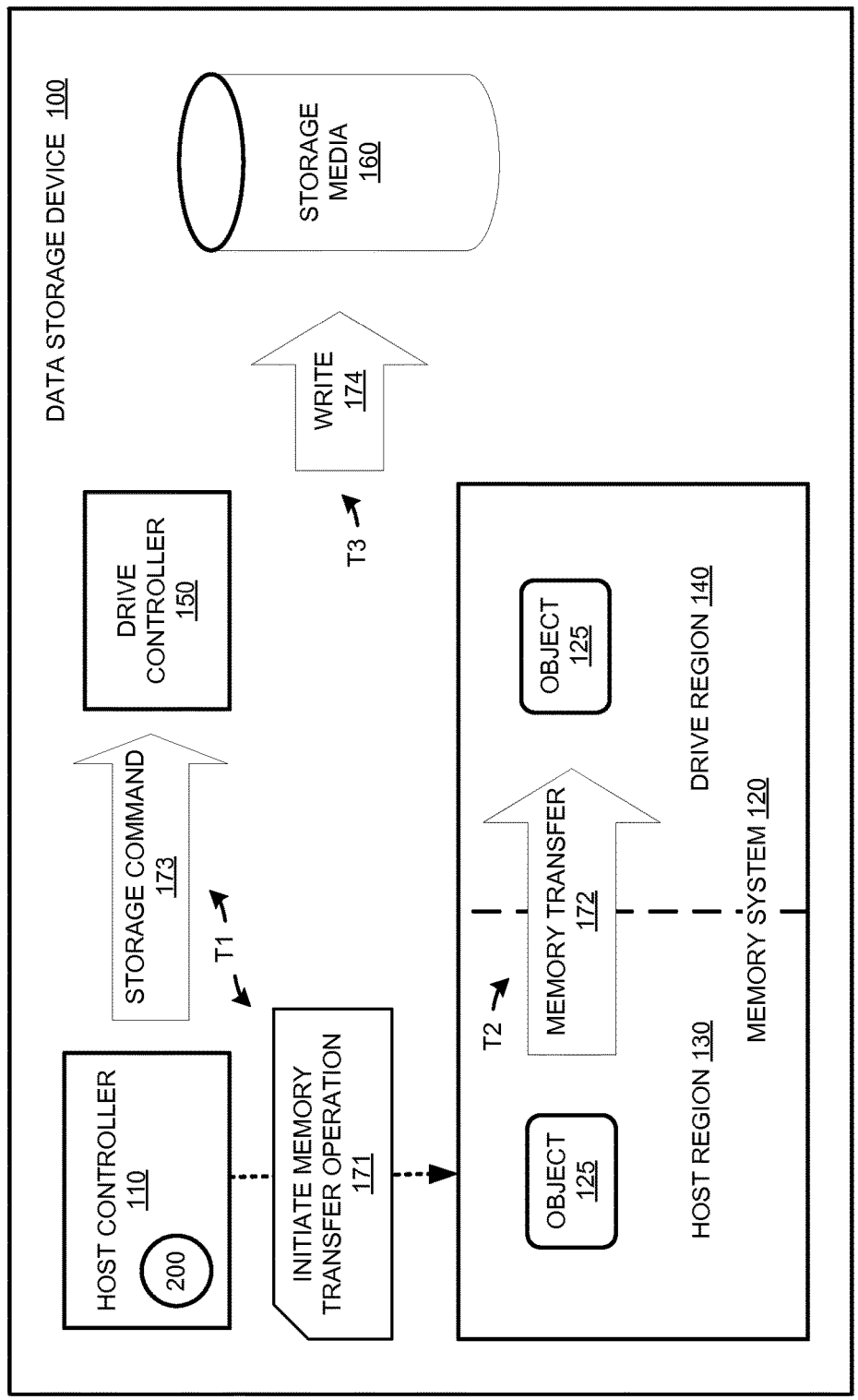
FIG. 1 illustrates a data storage device.

In particular, FIG. 1 illustrates data storage device 100 that transfers an object between regions of shared memory before writing the object to a storage media. Data storage device 100 may be deployed wirelessly, in a server rack, in a personal system, or in any hardware environment needing data storage. Data storage device 100 includes host controller 110, drive controller 150, storage media 160, and memory system 120. Memory system 120 may be any memory unit or aggregation of units that update, retain, and internally move objects as addressable data for later retrieval, such as a random access memory (RAM) chip, dynamic random access memory (DRAM), on-chip memory, or other memory device.

Memory system 120 is logically partitioned into host region 130 and drive region 140. Host controller 110 allocates host region 130. Host controller 110 may be an embedded computer that executes an instance of an operating system, such as Linux, Linux, or any other operating system. Host controller 110 may execute additional software to facilitate caching, quality of service, replication, federation, or other platform services. Drive controller 150 allocates drive region 140. Drive controller 150 may be an embedded computer that executes an instance of a real time operating system (RTOS). Drive controller 150 controls storage media 160. Storage media 160 may be any non-volatile online storage media, such as a magnetic or optical mechanical disk or a solid state drive.

Object 125 may be digital data, such as a byte sequence, a block, a structure, a text string, or a file. Object 125 may contain application data, a record, a multimedia object, executable code, a log, or other digital data item capable of being transferred, stored, and retrieved. Object 125 might be generated by a software application, a physical device, manual data entry, or by any other similar means. So long as object 125 is not too small, object 125 may be divided into smaller data objects. Likewise object 125 may have originally been assembled from smaller data objects.

In operation, object 125 is written to storage media 160. Initially at time T1, object 125 resides in host region 130 of memory system 120. Host controller 110 begins process 200 by initiating a transfer of object 125 from host region 130 to drive region 140, shown as initiate memory transfer operation 171. The transfer occurs within memory system 120, shown as memory transfer 172 occurring at time T2. At time T3, memory transfer 172 has finished, and object 125 resides in drive region 140.

At time T1, host controller 110 also transfers storage command 173 to drive controller 150. Although shown as occurring at the same time in FIG. 1, it should be understood that storage command 173 may be transferred before, after, or at the same time as initiate memory transfer operation 171. Storage command 173 directs drive controller 150 to write object 125 to storage media 160, shown as write 174. Memory transfer 172 may occur simultaneously with the transference of storage command 173. Access to object 125 by drive controller 150 or storage media 160 occurs at time T3, while object 125 resides in drive region 140.

Figure 2:
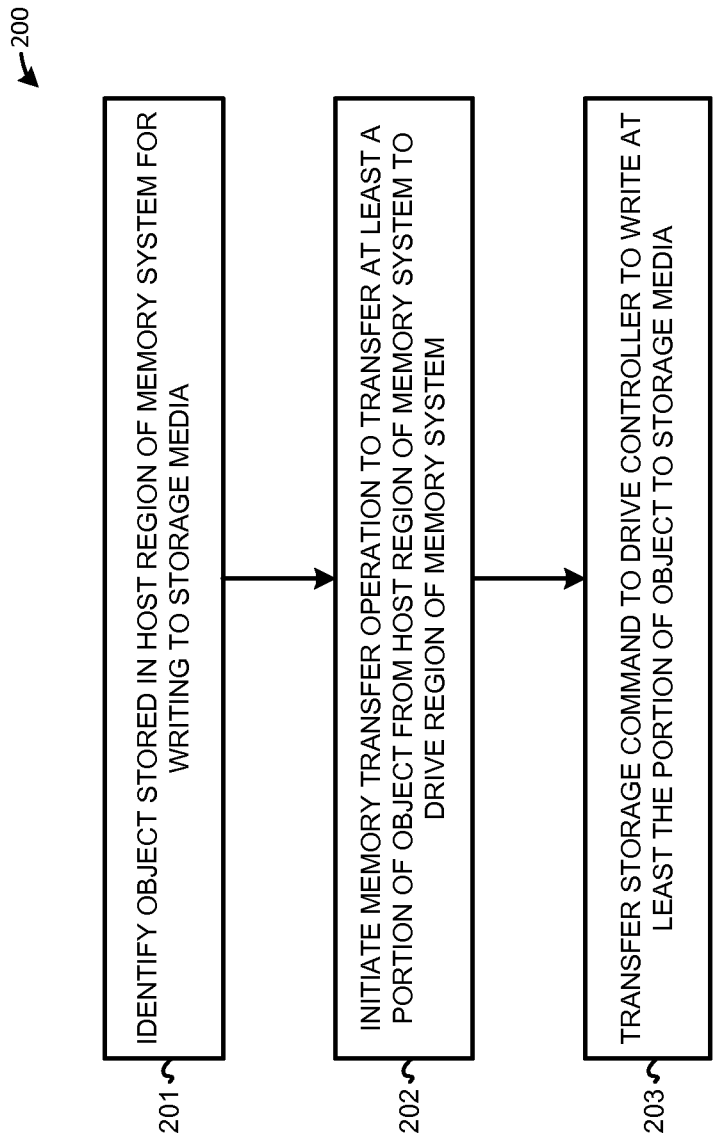
FIG. 2 illustrates a process executed by a host controller.

FIG. 2 illustrates the sequence of steps that host controller 110 performs while executing process 200 to transfer object 125 between regions of memory system 120 and then have object 125 written to storage media 160. Initially host controller 110 identifies (201) object 125 that resides in host region 130 of memory system 120. Earlier object 125 may have been transferred into host region 130 for storage from an external system. Host controller 110 initiates (202) memory transfer operation 171, causing memory transfer 172, which transfers at least a portion of object 125 from host region 130 to drive region 140. Host controller 110 transfers (203) a storage command to drive controller 140 to write at least a portion of object 125 to storage media 160. Performing steps 202 and 203 simultaneously may accelerate process 200. Alternatively, step 203 may occur prior to step 202 in some examples.

Figure 3:
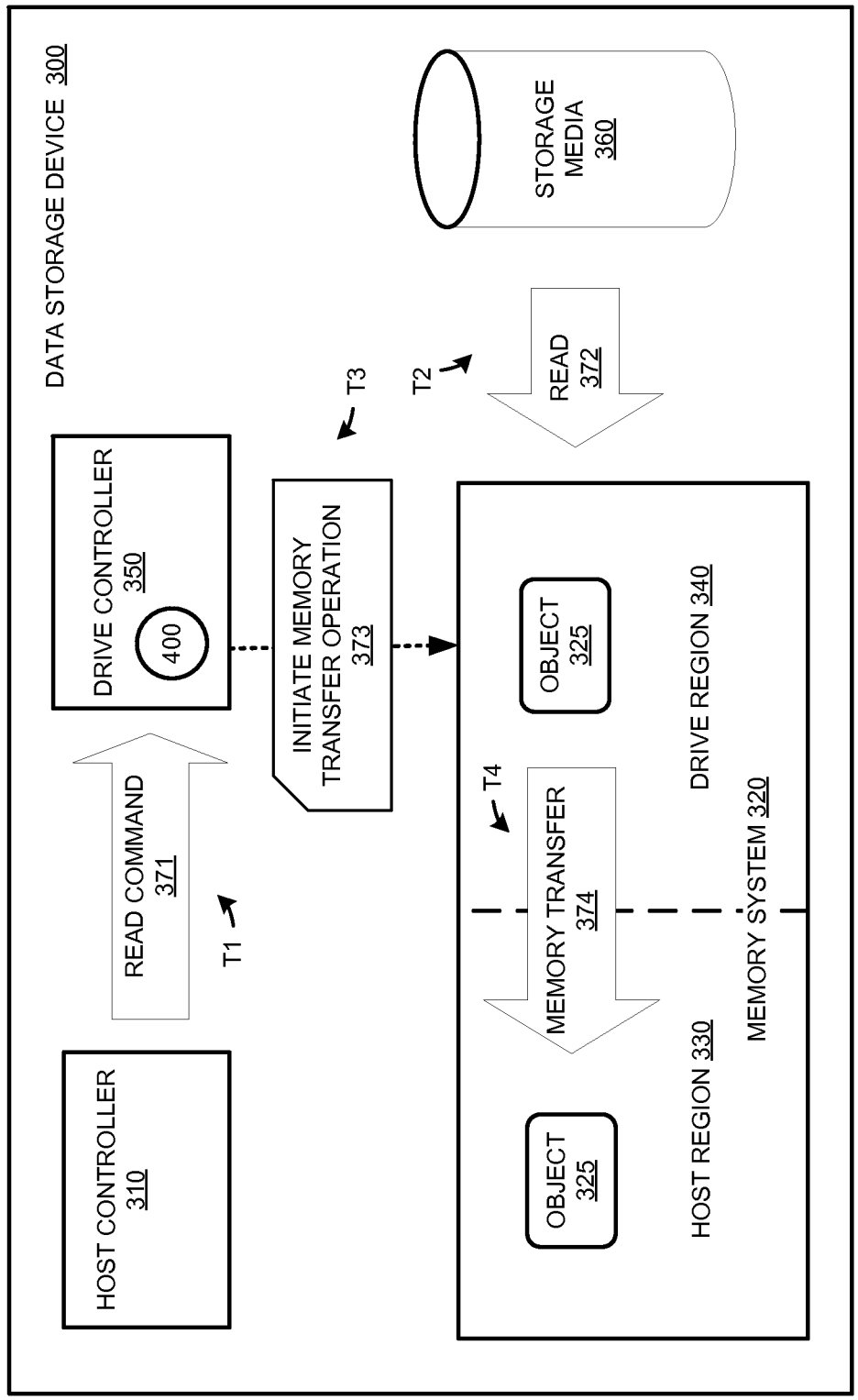
FIG. 3 illustrates a data storage device.

FIG. 3 illustrates data storage device 300 that transfers an object between regions of shared memory after reading the object from a storage media. Data storage device 300 differs in operation from data storage device 100 of FIG. 1. Data storage device 100 demonstrates an optimized data pathway for accelerating a write operation. Data storage device 300 demonstrates an optimized data pathway for accelerating a read operation. As such, data storage devices 100 and 300 demonstrate opposite storage operations and opposite data pathways through shared memory.

Data storage device 100 demonstrates a host controller that is responsible for data transfer between regions of shared memory. Data storage device 300 assigns that responsibility to a drive controller instead. An implementation has flexibility as to which controllers are responsible for data transfer between regions of shared memory.

In particular data storage device 300 includes host controller 310, drive controller 350, storage media 360, and memory system 320. Memory system 320 may be any memory unit or aggregation of units that update, retain, and internally move objects as addressable data for later retrieval, such as a RAM chip, DRAM, on-chip memory, or other memory device.

Memory system 320 is logically partitioned into host region 330 and drive region 340. Host controller 310 allocates host region 330. Host controller 310 may be an embedded computer that executes an instance of an operating system, such as Linux, or some other operating system. Host controller 310 may execute additional software to facilitate caching, quality of service, replication, federation, or other platform services.

Drive controller 350 allocates drive region 340. Drive controller 350 may be an embedded computer that executes an instance of an RTOS. Drive controller 350 controls storage media 360. Storage media 360 may be any non-volatile online storage media, such as a magnetic or optical mechanical disk, or a solid state drive.

Object 325 may be digital data, such as a byte sequence, a block, a structure, a text string, or a file. Object 325 may be application data, a record, a multimedia object, executable code, a log, or other digital data item capable of being transferred, stored, and retrieved. Object 325 may have been created by a software application, a physical device, manual data entry, or by any other similar means. So long as object 325 is not too small, object 325 may be divided into smaller data objects. Likewise, object 325 may have originally been assembled from smaller data objects.

To access object 325, host controller 310 transfers, at time T1, storage command 371 to drive controller 350, requesting that object 325 be read. Drive controller 350 reacts to storage command 371 by executing process 400. Process 400 begins by directing storage media 360 to read at least part of object 325 into drive region 340 of memory system 320 at time T2, shown as read 372. Drive controller 350 initiates a transfer of object 325 from drive region 340 to host region 330, shown as initiate memory transfer operation 373 at time T3. The transfer occurs within memory system 320, shown as memory transfer 374 at time T4. After time T4, memory transfer 374 has finished, and object 325 resides in host region 330.

Figure 4:
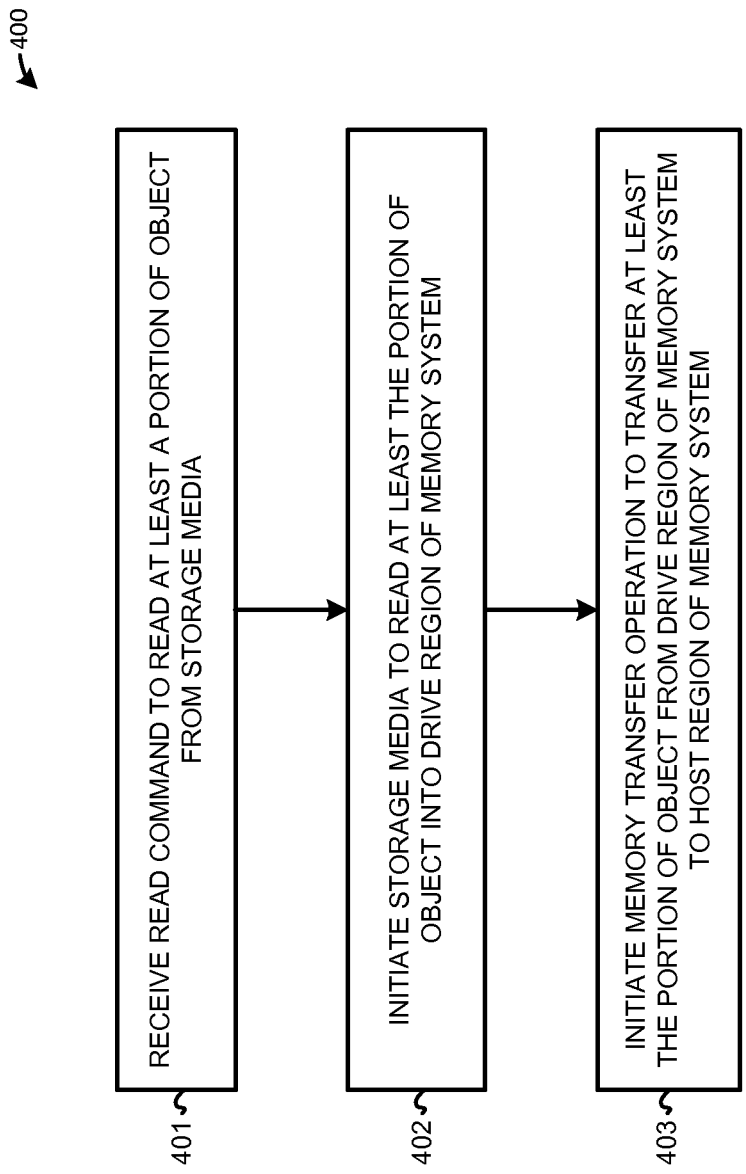
FIG. 4 illustrates a process executed by a drive controller.

FIG. 4 illustrates the sequence of steps that drive controller 350 performs while executing process 400 to read object 325 from storage media 360, and then transfer object 325 between regions of memory system 320. Initially, drive controller 350 receives (401) storage command 371 to read at least a portion of object 325 from storage media 360. Drive controller 350 reacts to storage command 371 by initiating (402) storage media 360 to read at least the portion of object 325 from storage media 360 into drive region 340 of memory system 320. In fulfillment of storage command 371, drive controller 350 initiates (403) a memory transfer operation to transfer at least the portion of object 325 from drive region 340 to host region 330.

Figure 5:
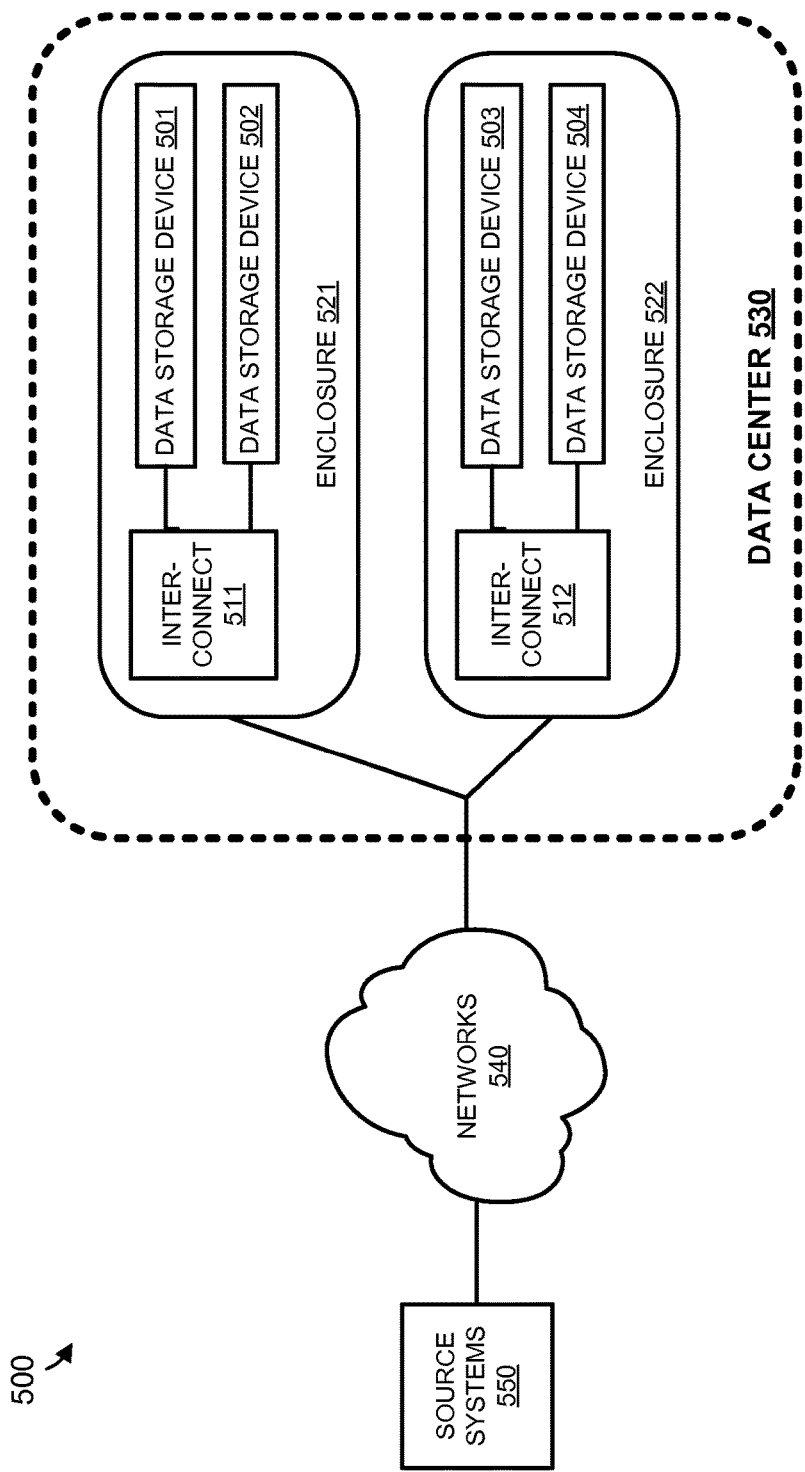
FIG. 5 illustrates a distributed storage system.

FIG. 5 illustrates distributed storage system 500 with multiple data storage devices to facilitate service quality factors such as scalability and reliability. Distributed storage system 500 includes enclosures 521-522, communication networks 540, and at least one source system 550. Source system 550 may be any data processing device capable of exchanging data with enclosures 550 over communication networks 540. Communication networks 540 is at least one network element, such as a connector, a hub, a bus, a switch, a router, a gateway, or any collection of these. Each of enclosures 521-522 may be a system rack, an electronics cabinet, or other physical structure for enclosing computer devices. Enclosures 521-522 respectively contain one of interconnects 511-512 and some number of data storage devices, such as data storage devices 501-504 as shown.

The form factor of data storage devices 501-504 may be a blade server, a rack card, or other packaging format. Although not shown, data storage devices 501-504 each contains a host controller, shared memory with regions, a storage media, and a drive controller. Data storage devices 501-504 are configured similar to data storage device 100 of FIG. 1. The host controller in each of data storage devices 501-504 executes process 200 of FIG. 2.

Data storage devices 501-502 are connected to interconnect 511. Data storage devices 503-504 are connected to interconnect 512. Each of interconnects 511-512 may be a hub, bus, switch, backplane, or other connection medium that can exchange data with data storage devices. Source systems 550 connect to interconnects 511-512 over communication networks 540. Communication networks 540 may be a single physical link, such as a wireless link or a metallic or optic link. Another implementation may achieve communication networks 540 with a collection of network equipment, such as the Internet.

Across communication networks 540, source systems 550 transfer data objects to be written to any of data storage devices 501-504. Retrieval of data objects from data storage devices 501-504, by source systems 550, also occurs over communication networks 540. Source systems 550 send storage requests. Data storage devices 501-504 send back responses to source systems 550. Data storage devices 501-504 may each contain a replica of an object, such as a file, and may each in parallel receive a request to read a different segment of the object, as with a segmented file transfer.

Figure 6:
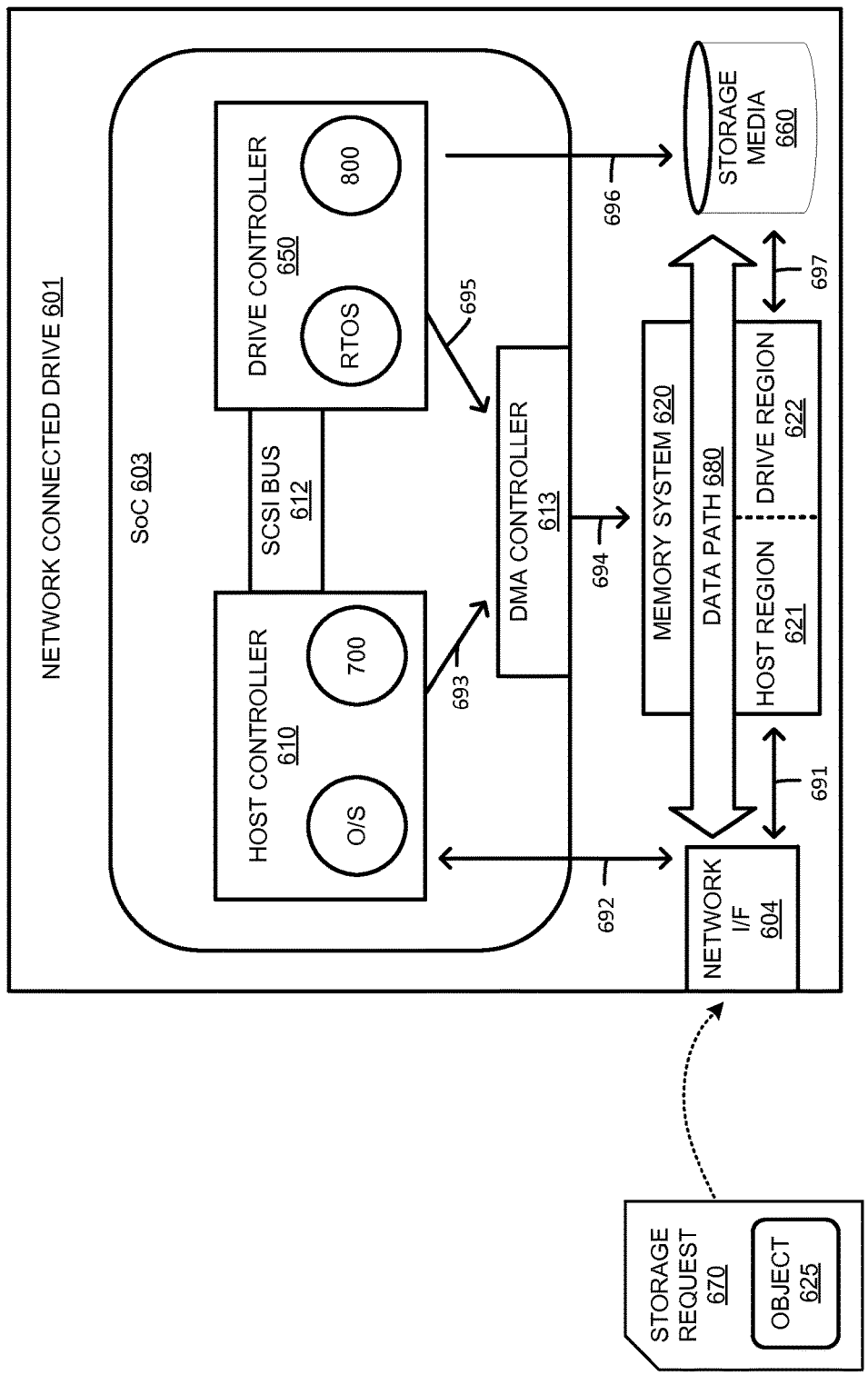
FIG. 6 illustrates a network storage system.

FIG. 6 illustrates network connected drive 601 that uses SCSI and DMA to execute network storage requests. Network connected drive 601 is representative of a data storage device that internally transfers an object within a memory system. Network connected drive 601 may be an implementation of data storage devices 100 and 300 of FIGS. 1 and 3, although data storage devices 100 and 300 may have other implementations. Although not shown, network connected drive 601 receives storage requests over a communication network, such as a local network, the Internet, or any communication network capable of delivering storage requests from external data processing systems and responses from network connected drive 601. Network connected drive 601 includes network interface 604, memory system 620, storage media 660, and system-on-chip (SoC) 603.

SoC 603 may be a processing system on a single chip substrate, on a multi-substrate three-dimensional chip, or on multiple chips in a system-in-package. SoC 603 contains host controller 610, drive controller 650, SCSI bus 612, and DMA controller 613. SCSI bus 612 includes circuitry to operate as a proprietary SCSI interface, or as a standard SCSI interface, such as parallel SCSI or serial attached SCSI. SCSI bus 612 supports at least a subset of the SCSI command protocol, including SCSI read commands, SCSI write commands, and other SCSI commands essential to SCSI operation.

DMA controller 613 implements at least a subset of DMA operations, including the transfer of a portion of an object between regions of memory system 620. For example DMA controller 613 may implement a block transfer operation that performs bulk movement, within memory system 620, of contiguous bytes. Memory system 620 may be any memory unit or aggregation of units that update, retain, and internally move objects as addressable data for later retrieval, such as a RAM chip, on-chip memory, or other memory device.

Although not shown, host controller 610 and drive controller 650 may be connected to memory system 620. Passing through memory system 620 and reaching network interface 604 and storage media 660 is data pathway 680. During operation, objects read or written by network connected drive 601 travel along data pathway 680, which avoids host controller 610 and drive controller 650.

Host controller 610 may be an embedded computer that loads and executes host software. Host software includes the logic of process 700 and an operating system, such as Linux, or a virtual operating system. Process 700 facilitates writing object 625 to storage media 660. During execution of process 700, host controller 610 operates (693) DMA controller 613 and issues SCSI commands on SCSI bus 612 to drive controller 650. Host controller 610 receives (692) storage request 670, including object 625 to be written, and optionally sends back a response through network interface 604. Network interface 604 includes circuitry that functions as a physical and logical adapter of a proprietary network link protocol or a standard interface such as Ethernet, Wi-Fi, or any other similar protocol. Upon receipt of object 625, network interface 604 transfers (691) object 625 into memory system 620.

Host controller 610 may be configured to receive, from network interface 604, and process commands of distributed file system protocols, such as NFS, Swift, Ceph, or Hadoop file system, and participate in segmented file transfer. Host controller 610 may be configured to operate network connected drive 601 as a node in a distributed data store, such as a distributed database. Host controller 610 may be configured to bind network interface 604 to a virtual local area network (VLAN). Host controller 610 may be configured to operate network connected drive 601 as a node in a distributed cache.

Drive controller 650 may be an embedded computer that executes drive software. Drive software includes a real time operating system and the logic of process 800. Process 800 facilitates reading objects from storage media 660. During execution of process 800, drive controller 650 receives SCSI commands on SCSI bus 612 from host controller 610. During execution of process 800, drive controller 650 operates (695) DMA controller 613 and controls (696) storage media 660 to read (697) a data object into memory system 620. Storage media 660 may be any non-volatile online storage media, such as a magnetic or optical mechanical disk or a solid state drive.

Figure 7:
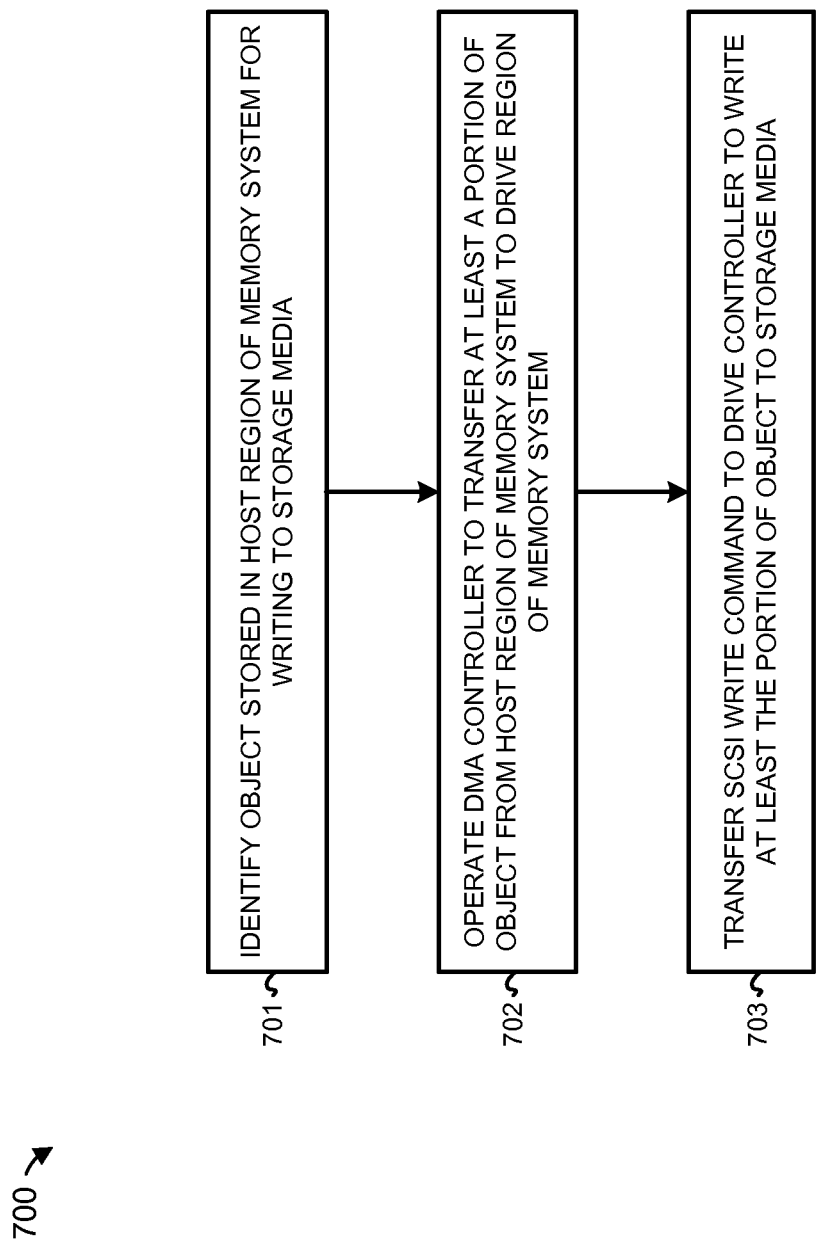
FIG. 7 illustrates a process executed by a host controller.

FIG. 7 illustrates the sequence of steps that host controller 610 performs while executing process 700 to transfer object 625 between regions of memory system 620 and then have object 625 written to storage media 660. Initially network interface 604 receives storage request 670 and transfers object 625 into a host region of memory system 620. Network interface informs host controller 610 of storage request 670, which causes host controller 610 to execute process 700.

Host controller 610 identifies (701) object 625 that resides in the host region of memory system 620. Host controller 610 operates (702) DMA controller 613 to transfer at least a portion of object 625 from the host region to a drive region of memory system 620. Host controller 610 transfers (703) a storage command over bus 612 to drive controller 650 to write at least a portion of object 625 to storage media 660. Performing steps 702 and 703 simultaneously may accelerate process 200 in some examples. Alternatively, step 703 may occur prior to step 702 in some examples.

Figure 8:
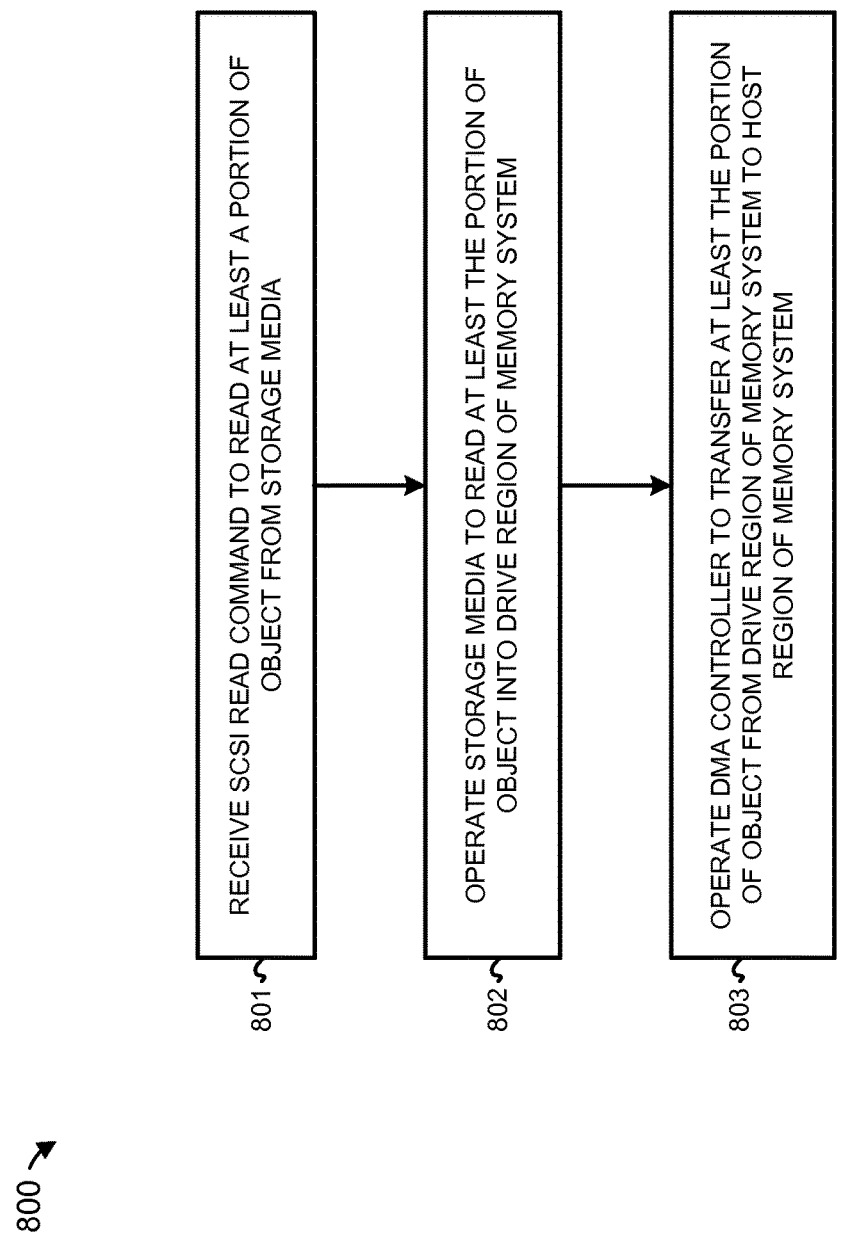
FIG. 8 illustrates a process executed by a drive controller.

FIG. 8 illustrates the sequence of steps that drive controller 650 performs while executing process 800 to read an object from storage media 660, and then transfer the object between regions of memory system 620. Initially drive controller 650 receives (801), over SCSI bus 612 from host controller 610, a SCSI read command to read at least a portion of the object from storage media 660. Drive controller 650 reacts to the SCSI read command by operating (802) storage media 660 to read at least the portion of the object from storage media 660 into the drive region of memory system 620. In fulfillment of the SCSI read command, drive controller 650 operates (803) DMA controller 613 to transfer at least the portion of the object from the drive region to the host region of memory system 620.

Figure 9:
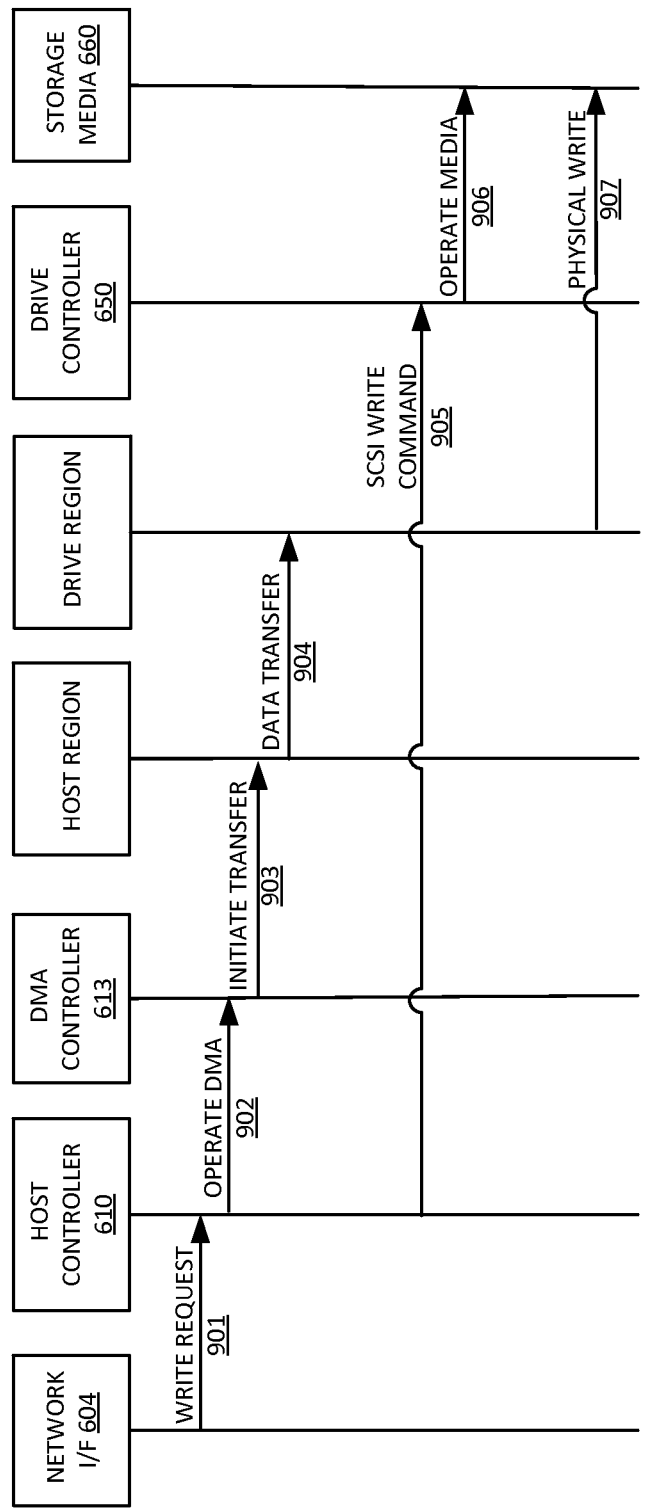
FIG. 9 illustrates a write scenario in a network storage system.

FIG. 9 illustrates the sequence of interactions that data storage device 601 performs while processing storage request 670 to write object 625. Network interface 604 receives storage request 670 and transfers at least part of object 625 into the host region of memory system 620. Network interface 604 informs (901) host control 610 of storage request 670. As operated (902) by host controller 610, DMA controller 613 initiates (903) the transfer of object 625. This transfers (904) object 625 from the host region to the drive region of memory system 620. Host controller 610 issues (905) on SCSI bus 612 a SCSI write command to drive controller 650. Drive controller 650 operates (906) storage media 660 to physically write at least part of object 625. Depending on the implementation of the storage media control interface, a physical write may involve (907) a direct transfer of part of object 625 from the drive region of memory system 620 to storage media 660. Although illustrated in a particular order in FIG. 9, it should be understood that this is merely illustrative and the steps may occur in a variety of different orders. For example, the issuing of the SCSI write command on the SCSI bus may occur at a variety of different point in the sequence.

Figure 10:
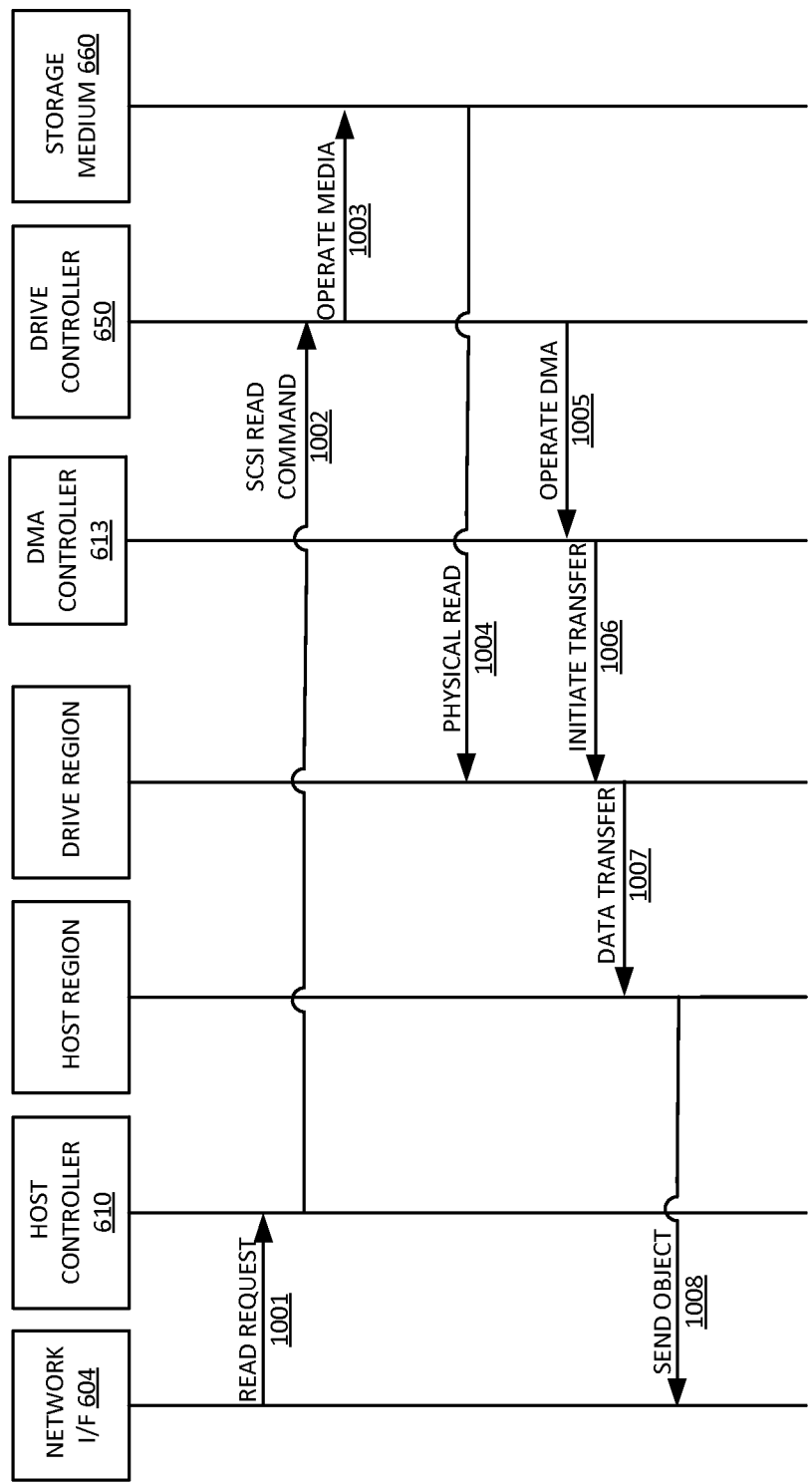
FIG. 10 illustrates a read scenario in a network storage system.

FIG. 10 illustrates the sequence of interactions that data storage device 601 performs while processing a storage request to read an object. Network interface 604 receives a storage request to read an object. Network interface informs (1001) host control 610 of the storage request. Host controller 610 then transfers (1002) over SCSI bus 612 to drive controller 650, a SCSI read command to read at least a portion of the object from storage media 660. Drive controller 650 reacts to the SCSI read command by operating (1003) storage media 660 to read at least the portion of the object. Storage media 660 reads (1004) at least the portion of the object into the drive region of memory system 620. In fulfillment of the SCSI read command, drive controller 650 operates (1005) DMA controller 613 to transfer at least the portion of the object within memory system 620. DMA controller initiates (1006) the transfer of at least the portion of the object between memory regions. This transfers (1007) at least part of the object from the drive region to the host region of memory system 620. Finally host controller 610 prepares a response that includes the object that was read. When network interface 604 transmits the response, network interface 604 may send (1008) the object directly from the host region.

FIG. 11 illustrates software-driven data storage system 1100 that initiates a memory transfer while storing a data object. Data storage system 1100 includes data storage device 1101 and computer readable medias 1130. Computer readable medias 1130 is at least one physical data container, such as memory or other storage media. Each of computer readable medias 1130 may be a non-volatile memory, a read only memory, a solid state or flash drive, or an optical or magnetic disk or tape drive. The data on computer readable medias 1130 is not transitory. Computer readable medias 1130 does not include physical media that propagate transitory signals, such as a communication media.

Stored on computer readable medias 1130 are program instructions 1140. Program instructions 1140 may be machine instructions, bytecode, or executable text. Program instructions 1140 contain at least the logic of process 1150. Process 1150 may be an implementation of process 200 or 700 of FIGS. 2 and 7.

Data storage device 1101 may be an implementation of data storage devices 100 and 501-504 and network connected drive 601 of FIGS. 1, 5, and 6. However data storage devices 100 and 501-504 and network connected drive 601 may have different implementations. Data storage device 1101 includes host controller 1110 and other components not shown. Host controller 1110 may be an implementation of host controllers 110 and 610 of FIGS. 1 and 6. However, host controllers 110 and 610 may have different implementations.

Host controller 1110 includes processing system 1120. Processing system 1120 has sufficient circuitry and configuration to load and execute program instructions. Processing system 1120 may include one or more microprocessors, cache or other memory, one or more buses, and other processing components and circuitry.

Processing system 1120 loads and executes program instructions 1140 that encode the logic of process 1150, shown as execute 1160. Processing system 1120 uses an instruction loading mechanism that depends on the form and format of computer readable storage medias 1130. When executed by host controller 1110, program instructions 1140 direct host controller 1110 to perform process 1150 that initiates a memory transfer while storing a data object.

FIG. 12 illustrates software-driven data storage system 1200 that initiates a memory transfer while reading a data object. Data storage system 1200 differs in operation from data storage system 1100 of FIG. 11. Data storage system 1100 demonstrates software configuration for accelerating a write operation. Data storage system 1200 demonstrates software configuration for accelerating a read operation. As such data storage systems 1100 and 1200 demonstrate opposite storage operations.

Data storage system 1200 includes data storage device 1201 and computer readable medias 1230. Computer readable medias 1230 is at least one physical data container, such as memory or other storage media. Each of computer readable medias 1230 may be a non-volatile memory, a read only memory, or an optical or magnetic disk or tape. The data on computer readable medias 1230 is not transitory. Computer readable medias 1230 does not include physical media that propagate transitory signals, such as a communication media.

Stored on computer readable medias 1230 are program instructions 1240. Program instructions 1240 may be machine instructions, bytecode, or executable text. Program instructions 1240 contain at least the logic of process 1250. Process 1250 may be an implementation of process 400 or 800 of FIGS. 4 and 8.

Data storage device 1201 may be an implementation of data storage devices 300 and 501-504 and network connected drive 601 of FIGS. 3, 5, and 6. However data storage devices 300 and 501-504 and network connected drive 601 may have different implementations. Data storage device 1201 includes drive controller 1210 and other components not shown. Drive controller 1210 may be an implementation of drive controllers 350 and 650 of FIGS. 3 and 6. However, drive controllers 350 and 650 may have different implementations.

Drive controller 1210 includes processing system 1220. Processing system 1220 has sufficient circuitry and configuration to load and execute program instructions. Processing system 1220 may include one or more microprocessors, cache or other memory, one or more buses, and other processing components and circuitry.

Processing system 1220 loads and executes program instructions 1240 that encode the logic of process 1250, shown as execute 1260. Processing system 1220 uses an instruction loading mechanism that depends on the form and format of computer readable storage medias 1230. When executed by drive controller 1210, program instructions 1240 direct drive controller 1210 to perform process 1250 that initiates a memory transfer while reading a data object.

Although illustrated in some of the previous examples as using a SCSI bus to communicate between the host controller and the drive controller, it should be understood that this is merely illustrative and that the communication bus between the host and the drive controller may communicate using a variety of different communication bus formats. Such bus formats may include SATA, SAS, fibre channel, or any other storage protocol, including improvements thereof.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A data storage device comprising:
a memory system connected to a host controller and a drive controller, wherein the memory system is logically portioned into a host region allocated to store objects for the host controller and a drive region allocated to store objects for the drive controller;
wherein the host controller is configured to:
identify an object stored in the host region for writing to storage media controlled by the drive controller;
initiate a memory transfer operation to transfer at least a portion of the object from the host region to the drive region; and
transfer a storage command to the drive controller to write at least the portion of the object to the storage media; and
wherein the drive controller is configured to receive and process the storage command to write to the storage media at least the portion of the object in the drive region.

2. The data storage device of claim 1 further comprising a direct memory access (DMA) controller connected to the memory system and the host controller, wherein initiating a memory transfer operation to transfer at least a portion of the object from the host region to the drive region comprises operating the DMA controller to transfer at least a portion of the object from the host region to the drive region.

3. The data storage device of claim 1 wherein the storage command comprises a small computer system interface (SCSI) write command.

4. The data storage device of claim 1 wherein the drive controller is further configured to:
receive a read command to read at least a portion of a second object from the storage media;
initiate a read of the storage media for at least the portion of the second object from the storage media into the drive region; and
initiate a memory transfer operation to transfer at least the portion of the second object from the drive region to the host region.

5. The data storage device of claim 1 wherein the host controller and the drive controller each execute an operating system instance.

6. The data storage device of claim 1 wherein the host controller, the drive controller, and the memory system are incorporated within a protective package comprising one or more integrated circuits.

7. The data storage device of claim 1 wherein the host controller, the drive controller, and the memory system are incorporated within one or more integrated circuits.

8. The data storage device of claim 1 further comprising a communication interface connected to the host controller and configured to:
receive at least the portion of the object; and
transfer, to the host region, at least the portion of the object for writing to the storage media.

9. The data storage device of claim 8 wherein the communication interface comprises a network interface configured for Ethernet.

10. The data storage device of claim 1 wherein the storage media comprises one or more hard disk drives or solid state drives.

11. An apparatus comprising:
one or more computer readable storage media;
a host controller operatively coupled to the one or more computer readable storage media; and
program instructions stored on the one or more computer readable storage media that, when executed by the host controller, direct the host controller to:
identify an object stored in a host region of a memory system for writing to storage media controlled by a drive controller, wherein the memory system is logically partitioned into the host region allocated to store objects for the host controller and a drive region allocated to store objects for the drive controller;
initiate a memory transfer operation to transfer at least a portion of the object from the host region to the drive region; and
transfer a storage command to the drive controller to write at least the portion of the object to the storage media;
wherein the memory system is connected to the host controller and the drive controller.

12. The apparatus of claim 11 wherein initiating a memory transfer operation to transfer at least a portion of the object from the host region to the drive region comprises operating a direct memory access (DMA) controller to transfer at least a portion of the object from the host region to the drive region.

13. The apparatus of claim 11 wherein the storage command comprises a small computer system interface (SCSI) write command.

14. The apparatus of claim 11 wherein the storage media comprises one or more hard disk drives or solid state drives.

15. The apparatus of claim 11 wherein the program instructions further direct the host controller to:
receive at least the portion of the object from a communication interface; and
transfer, to the host region, at least the portion of the object for writing to the storage media.

16. The apparatus of claim 15 wherein the communication interface comprises a network interface configured for Ethernet.

17. An apparatus comprising:
one or more computer readable storage media;
a drive controller operatively coupled to the one or more computer readable storage media; and
program instructions stored on the one or more computer readable storage media that, when executed by the drive controller, direct the drive controller to:
receive a read command from a host controller to read at least a portion of an object from storage media into a drive region of a memory system, wherein the memory system is logically partitioned into a host region allocated to store objects for the host controller and the drive region allocated to store objects for the drive controller;
in response to the read command, initiate a read of the storage media for at least the portion of the object from the storage media into the drive region; and
initiate a memory transfer operation to transfer at least the portion of the object from the drive region to the host region;
wherein the memory system is connected to the host controller and the drive controller.

18. The apparatus of claim 17 wherein the storage media comprises one or more hard disk drives or solid state drives.

19. The apparatus of claim 17 wherein the read command comprises a data read command transferred over a communication bus.

20. The apparatus of claim 19 wherein the communication bus comprises a small computer system interface (SCSI) bus.

21. A system comprising:
a switch; and
a plurality of data storage devices;
wherein each data storage device of the plurality of data storage devices comprises:
a network interface through which objects are received from the switch and through which the objects are sent to the switch;
a memory system connected to a host controller and a drive controller, wherein the memory system is logically portioned into a host region allocated to store objects for the host controller and a drive region allocated to store objects for the drive controller;
the host controller configured to:
identify an object obtained from the network interface and stored in a host region for writing to storage media controlled by the drive controller;
initiate a memory transfer operation to transfer at least a portion of the object from the host region to the drive region; and
transfer a storage command to the drive controller to write at least the portion of the object to the storage media; and
the drive controller configured to:
receive and process the storage command to write to the storage media at least the portion of the object in the drive region.

22. The system of claim 21 wherein the host controller is further configured to:
receive the object from the network interface; and
transfer, to the host region, object for writing to the storage media.

23. The system of claim 21 wherein the drive controller is further configured to:
receive a read command to read at least a portion of a second object from the storage media;
initiate a read of the storage media for at least the portion of the second object from the storage media into the drive region; and
initiate a memory transfer operation to transfer at least the portion of the second object from the drive region to the host region.

24. A data storage device having a memory system connected to a host controller and a drive controller, wherein the memory system is logically portioned into a host region allocated to store objects for the host controller and a drive region allocated to store objects for the drive controller, the data storage device comprising:
a means for identifying an object stored in the host region for writing to storage media controlled by the drive controller;

a means for initiating a memory transfer operation to transfer at least a portion of the object from the host region to the drive region;

a means for transferring a storage command to the drive controller to write at least the portion of the object to the storage media; and a means for receiving and processing the storage command to write to the storage media at least the portion of the object in the drive region.

\* \* \* \* \*